Patented Nov. 9, 1943

2,334,042

UNITED STATES PATENT OFFICE 2,334,042

VULCANIZATION OF RUBBER

Winfield Scott, Akron, Ohio, assignor to Wingfoot Corporation, Wilmington, Del., a corporation of Delaware No Drawing. Application March 6, 1942,
Serial No. 433,633

6 Claims. (Cl. 260—788)

This invention relates to the vulcanization of rubber with a new and improved accelerator. It includes the process of vulcanization and the vulcanized rubber product.

According to this invention, the rubber is vulcanized in the presence of an accelerator which has the formula R—S—CH$_2$—NH—SO$_2$—R$_1$, where R is a thiazyl or thiazolyl radical derived from a thiazole or a thiazoline and R$_1$ is an aryl group. The thiazyl group may be 2-benzothiazyl, 6-nitro-2-benzothiazyl, 6-chlor-2-benzothiazyl, 4-phenyl-2-benzothiazyl, 4-methyl-2-benzothiazyl, 6-ethoxy-2-benzothiazyl, 6-methoxy-2-benzothiazyl, 6-chlor-5-nitro-2-benzothiazyl, 6-hydroxy-2-benzothiazyl, 5-nitro-2-benzothiazyl, 5-chlor-2-benzothiazyl, tetrahydro-2-benzothiazyl, the alpha and beta naphthothiazyls, both substituted and unsubstituted, and other alkyl, aryl, nitro, amino, hydroxy, halo, alkoxy, etc. derivatives of the arylene-2-thiazyl group. The thiazyl group may also be 2-thiazyl or a substituted thiazyl group such as 4-methyl-2-thiazyl, 4-5-dimethyl-2-thiazyl, 5-methyl-2-thiazyl, 5-phenyl-2-thiazyl, 5-benzyl-2-thiazyl, 4-methoxy-5-methyl-2-thiazyl, 5-(4-chlorphenyl)-2-thiazyl or 4-chlor-2-thiazyl and other thiazyls substituted in the 4-, or 5-, or 4- and 5-positions with an alkyl, alkoxy, thialkyl, aryl, aralkyl, chloro or nitro, etc. group. The mercaptothiazolyl group may be 2-thiazolyl-4-methyl-2-thiazolyl, 4-ethyl-2-thiazolyl, 4-benzyl-2-thiazolyl and 5-chloro-2-thiazolyl, or other groups in which the 4- or 5-position or both may be substituted with a usual substituent.

The R$_1$ of the formula is a part of the sulfonamide group. In spite of the fact that it is usual to refer to such compounds as benzene sulfonamide, toluene sulfonamide, etc. R$_1$ is referred to herein as a radical. It may be phenyl, tolyl, alpha naphthyl, beta naphthyl, xenyl, etc. and may form groups such as benzene-4-chloro sulfonylamido, toluene-2-hydroxy-4-sulfonylamido, a naphthalene disulfonylamido, xylene sulfonylamido mixture or a mixture of any one or more of the sulfonylamido compounds.

The new accelerators may be prepared in one of several ways. For example, they may be prepared by mixing the mercaptothiazole or mercaptothiazoline, formaldehyde, and the sulfonamide and subjecting them to reacting conditions. As an alternative method, the mercaptothiazole or mercaptothiazoline may be reacted with a methylol sulfonamide. As a third method of preparing the compounds the sulfonamide may be reacted with a 2-methylol mercaptothiazole or mercaptothiazoline.

Representative methods of preparing the accelerators are given below.

Example 1

The new compound may be prepared in a solvent such as alcohol, as follows: Sixteen and seven-tenths grams (0.1 mol) of 2-mercaptobenzothiazole, 17.1 grams (0.1 mol) of p-toluene sulfonamide and 8.5 grams (slightly in excess of 0.1 mol) of 37% formaldehyde were added to 300 cc. of alcohol and warmed for a few minutes. To the solution was then added 25 ml. of concentrated hydrochloric acid. The mixture was then refluxed for two hours, then allowed to stand at room temperature. Soon yellow leaflets began to separate. After filtering, washing and drying these crystals, they were found to melt at 161–162° C.

Example 2

The material of Example 1 can also be made without the use of an acid catalyst. Thirty-three and four-tenths grams of 2-mercaptobenzothiazole, 34.2 grams of p-toluene sulfonamide and 6.0 grams of paraformaldehyde were added to 300 cc. of benzene in a flask equipped with a stirrer, thermometer and reflux containing a water trap in the condensate return. When no more water was formed, the refluxing was stopped, and flask and contents allowed to cool. Yellow leaflets melting at 161–162° C. separated out in a yield of 86%. The analysis for nitrogen, calculated at 8.00%; found, 7.67%. This indicates the reaction of equal mols of the three reactants and the formula is presumed to be that given above.

Example 3

Substituting 2-mercapto-6-ethoxy benzothiazole for 2-mercaptobenzothiazole in the procedure of Example 2, the reaction proceeds smoothly to give the corresponding derivative. In this experiment, one tenth molar quantities were used in a solution of 100 cc. of toluene. The theoretical amount of water of condensation was obtained and the crystalline reaction product after recrystallizing from toluene, melted at 157° C.

Example 4

Alkyl or unsubstituted mercaptothiazoles undergo the reaction with formaldehyde and a sulfonamide as readily as arylene mercaptothiazoles. Thirteen and one-tenth grams of 4-methyl-2-mercaptothiazole, 17.1 grams of p-toluene sulfonamide and 3.0 grams of paraformaldehyde were heated to the refluxing temperature of toluene in 100 cc. of this solvent. The reaction proceeds smoothly and the crystalline reaction product melted at 134° C. and after recrystallization from toluene at 135° C.

*Example 5*

Twenty-three and eight-tenths grams (0.2 mol) of 2-mercaptothiazoline and 34.2 grams (0.2 mol) of p-toluene sulfonylamide are added to 250 cc. of benzene in a suitable reaction vessel equipped with a stirrer and a reflux with a water trap in the return. The suspension is heated to refluxing of the solvent when five drops of concentrated hydrochloric acid is added. Six grams of paraformaldehyde is added in portions and refluxing is continued until no more water is obtained in the trap. In this case, 3.4 cc. of water was recovered. The reaction product crystallizes out on cooling and is obtained as white crystals. After crystallization from benzene, the product was found to melt at 126–128° C.

Materials made according to Examples 2, 3 and 4 were tested by compounding them in rubber according to the following formula:

| | Parts |
|---|---|
| Smoked sheet | 100.0 |
| Zinc oxide | 5.0 |
| Sulfur | 3.0 |
| Accelerator | 0.5 |
| Diphenylguanidine | 0.2 |

The results of these tests are given in the following table:

| Accelerator | Time and temp. cure | Tensile | Elong. | Modulus | |
|---|---|---|---|---|---|
| | | | | 500% | 700% |
| | | Kg./cm.² | Per cent | | |
| Example 2 | 20/240 | 110 | 900 | 13 | 37 |
| | 30 | 142 | 830 | 20 | 66 |
| | 40 | 178 | 805 | 27 | 96 |
| | 60 | 182 | 755 | 35 | 133 |
| Example 3 | 20/240 | 73 | 930 | 9 | 23 |
| | 30 | 105 | 865 | 14 | 43 |
| | 40 | 136 | 825 | 19 | 68 |
| | 60 | 151 | 765 | 28 | 103 |
| Example 4 | 20/240 | 108 | 890 | 13 | 40 |
| | 30 | 137 | 835 | 19 | 65 |
| | 40 | 134 | 785 | 23 | 81 |
| | 60 | 158 | 745 | 32 | 122 |

The activity of this class of compounds when used for the acceleration of vulcanization is indicated by the above physical properties of the rubbers produced.

The accelerators are especially active when used with a small amount of a non-volatile or a slightly volatile organic base, such as diphenylguanidine, di-o-tolyl guanidine, hexamethylene tetramine, methylene aniline, methylene di piperidine, dibenzylamine etc. The use of such a base is not essential.

I claim:

1. The process of vulcanizing rubber which comprises vulcanizing the rubber in the presence of an accelerator having the formula

where R is a radical of the group consisting of thiazyls and thiazolyls and R₁ is an aryl radical.

2. The method of treating rubber which comprises vulcanizing the rubber in the presence of an N-(2-benzothiazylthiomethylene) arylsulfonamide as an accelerator.

3. The process of vulcanizing rubber which comprises vulcanizing the rubber in the presence of an organic base and an accelerator having the formula R—S—CH₂—NH—SO₂—R₁, where R is a radical of the group consisting of thiazyls and thiazolyls and R₁ is an aryl radical.

4. The method of treating rubber which comprises vulcanizing the rubber in the presence of an organic base and an N-(2-benzothiazylthiomethylene) arylsulfonamide as an accelerator.

5. Rubber vulcanized in the presence of an accelerator having the formula

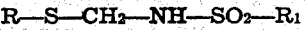

where R is a radical of the group consisting of thiazyls and thiazolyls and R₁ is an aryl radical.

6. Rubber vulcanized in the presence of an N-(2-benzothiazylthiomethylene) arylsulfonamide as an accelerator.

WINFIELD SCOTT.